United States Patent
Abe

(10) Patent No.: US 9,948,222 B2
(45) Date of Patent: Apr. 17, 2018

(54) DRIVE METHOD FOR NON-CONTACT POWER SUPPLY DEVICE, NON-CONTACT POWER SUPPLY DEVICE, AND NON-CONTACT POWER SUPPLY SYSTEM

(71) Applicant: PANASONIC CORPORATION, Osaka (JP)

(72) Inventor: Hideaki Abe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 607 days.

(21) Appl. No.: 14/344,693

(22) PCT Filed: Sep. 21, 2012

(86) PCT No.: PCT/JP2012/006026
§ 371 (c)(1),
(2) Date: Mar. 13, 2014

(87) PCT Pub. No.: WO2013/042380
PCT Pub. Date: Mar. 28, 2013

(65) Prior Publication Data
US 2014/0346889 A1   Nov. 27, 2014

(30) Foreign Application Priority Data
Sep. 22, 2011  (JP) ................................ 2011-207453

(51) Int. Cl.
*H02J 5/00* (2016.01)
*H02J 17/00* (2006.01)
(Continued)

(52) U.S. Cl.
CPC ................ *H02P 9/48* (2013.01); *H02J 5/005* (2013.01); *H02J 7/025* (2013.01); *H02J 17/00* (2013.01);
(Continued)

(58) Field of Classification Search
CPC . H01F 38/14; H02J 5/005; H02J 7/025; H02J 17/00; H02J 50/10; H02J 50/12;
(Continued)

(56) References Cited

U.S. PATENT DOCUMENTS 4,871,959 A * 10/1989 Gali ...................... H02J 7/0057
                                                                320/101
5,703,474 A * 12/1997 Smalser ................. H02N 2/181
                                                                310/318

(Continued)

FOREIGN PATENT DOCUMENTS

CN         2679961 Y      2/2005
CN      101873014 A      10/2012
(Continued)

OTHER PUBLICATIONS

Ottman et al., "Adaptive Piezoelectric Energy Harvesting Circuit for Wireless Remote Power Supply", IEEE Transactions on Power Electronics, vol. 17, No. 5, Sep. 2002, pp. 669-676.*
(Continued)

*Primary Examiner* — Levi Gannon
(74) *Attorney, Agent, or Firm* — Renner, Otto, Boisselle & Sklar, LLP

(57) ABSTRACT

A power supply device (2) is provided with a push-type power generator (4). When a push-button (5) on the push-type power generator (4) is pushed, a variable voltage is generated by a piezoelectric element (6) that excites a primary coil (L1). A high-frequency inverter (8) is activated by the variable voltage, exciting the primary coil (L1), and an alternating field is generated from the primary coil (L1). Secondary power can be supplied by means of the alternating field even if a secondary coil (L2) of an electrical device (10), disposed on a surface of a wall (1) opposite the surface on which the charging device (2) is disposed, is not in contact with the power supply device (2). The secondary coil (Continued)

(L2) of the electrical device (10) causes a light-emitting diode (LED1) to illuminate using secondary power obtained by non-contact power supply.

10 Claims, 8 Drawing Sheets

(51) Int. Cl.
 $H02N\ 2/18$ (2006.01)
 $H02P\ 9/48$ (2006.01)
 $H02J\ 50/12$ (2016.01)
 $H02J\ 50/60$ (2016.01)
 $H02J\ 7/02$ (2016.01)
 $H02M\ 7/48$ (2007.01)

(52) U.S. Cl.
 CPC .............. *H02J 50/12* (2016.02); *H02J 50/60* (2016.02); *H02M 7/48* (2013.01); *H02N 2/186* (2013.01); *H02N 2/181* (2013.01)

(58) Field of Classification Search
 CPC .......... H02N 2/18; H02N 2/181; H02N 2/186; H02N 2/188; H02P 9/48; H04B 5/0037; H04B 5/0075; H04B 5/0093
 USPC ........................................................ 307/104
 See application file for complete search history.

(56) References Cited

U.S. PATENT DOCUMENTS

| | | | |
|---|---|---|---|
| 9,270,201 B1* | 2/2016 | Potharaju | H02M 1/143 |
| 2005/0088310 A1* | 4/2005 | Sakai | E05B 45/06 340/693.2 |
| 2005/0105224 A1* | 5/2005 | Nishi | H02M 3/285 361/18 |
| 2005/0156738 A1* | 7/2005 | Grimshaw | G08B 25/10 340/565 |
| 2008/0054638 A1 | 3/2008 | Greene et al. | |
| 2008/0252254 A1* | 10/2008 | Osada | H01M 10/0436 320/108 |
| 2009/0243842 A1 | 10/2009 | Mitchell et al. | |
| 2009/0273322 A1 | 11/2009 | Riley et al. | |
| 2010/0181842 A1 | 7/2010 | Suzuki et al. | |
| 2010/0270867 A1 | 10/2010 | Abe | |
| 2011/0252845 A1* | 10/2011 | Webb | E06B 7/28 70/101 |
| 2011/0299303 A1* | 12/2011 | Lee | H02J 3/385 363/21.02 |
| 2012/0262967 A1* | 10/2012 | Cuk | H02M 7/4807 363/131 |
| 2013/0313910 A1* | 11/2013 | Sasaki | H02J 7/025 307/104 |
| 2014/0015336 A1* | 1/2014 | Weber | H01F 38/14 307/104 |
| 2014/0133212 A1* | 5/2014 | Evans, Jr. | G11C 11/2297 365/145 |
| 2014/0268648 A1* | 9/2014 | Gomes | F25D 27/005 362/94 |

FOREIGN PATENT DOCUMENTS

| | | |
|---|---|---|
| DE | 10 2007 036 452 A1 | 2/2009 |
| JP | 08-315865 A | 11/1996 |
| JP | 2000-032104 A | 1/2000 |
| JP | 2002-119498 A | 4/2002 |
| JP | 2002-320348 A | 10/2002 |
| JP | 2004-204533 A | 7/2004 |
| JP | 2009005475 A | 1/2009 |
| JP | 2009-207511 A | 9/2009 |
| JP | 2011-050163 A | 3/2011 |
| WO | WO 2009/020756 A1 | 2/2009 |
| WO | WO 2010/029315 A2 | 3/2010 |

OTHER PUBLICATIONS

International Preliminary Report on Patentability for corresponding International Application No. PCT/JP2012/006026 dated Nov. 27, 2012 (English translation).
Extended European Search Report for corresponding European Application No. EP 12 83 3231 dated Jun. 16, 2015.
Kanai et al., "A non-contact power-supply card powered by solar cells for mobile communications" 15th Annual IEEE, IEEE vol. 2, Feb. 6, 2000, pp. 1157-1162 (XP010371642).
Kymissis et al., "Parasitic power harvesting in shoes" Wearable Computers, 1998 Digest of Papers. 2nd International Symposium on Pittsburgh, PA, USA Oct. 19, 1998, pp. 132-139 (XP032385438).
Chinese Office Action for corresponding Chinese application No. 201280045465.8 dated Sep. 9, 2015, with English machine translation.
European Office Action dated Aug. 11, 2016 for corresponding European Application No. 12 833 231.9.
International Search Report for corresponding International Application No. PCT/JP2012/006026 dated Nov. 27, 2012.
Kanai et al., "Non-Contact Power-Supply System Powered by Solar Cells", Technical Report of IEICE, EE98-47, OFT98-40 (Oct. 1998) and partial translation of Chapter 4.
Japanese Office Action dated Aug. 23, 2016 for corresponding Japanese Application No. 2015-220318.
Office Action of the corresponding Korean Patent Application dated Jun. 12, 2017.
Office Action dated Dec. 28, 2017 for corresponding Korean Application No. 2014/0065419.

* cited by examiner

DRIVE METHOD FOR NON-CONTACT POWER SUPPLY DEVICE, NON-CONTACT POWER SUPPLY DEVICE, AND NON-CONTACT POWER SUPPLY SYSTEM

TECHNICAL FIELD

The present invention relates to a method for driving a contactless power supply device, a contactless power supply device, and a contactless power supply system.

BACKGROUND ART

Over these recent years, to cope with the depletion of fossil fuel and the need to stop global warming, the so-called energy harvesting (environmental power generation) is gathering attention and undergoing research and development. Energy harvesting uses natural energy, which is obtained through photovoltaic power generation, wind force power generation, and the like; piezoelectric/vibration powered generation; and human powered generation performed in living activities.

For example, power may be generated when the pushing of a button causes a mechanical switch to change inductance, increases the generated voltage to obtain a weak power, drive a high frequency wireless system, and radiate the weak electric wave to the vicinity to control the device.

An old and well known technique uses rotational kinetic energy of a bicycle tire to generate power, which is supplied to a lamp, with a power generator referred to as a dynamo generating capacity. The power generator generally has the same structure as a DC motor and uses a mechanism allowing for reversible electrical-mechanical energy conversion.

Further, a flash light including a power generator has been commercialized over these recent years. When a handle or a lever of the flashlight is operated and a rotor of the power generator is rotated, the flashlight generates power and activates an LED light.

Contactless power supply that supplies an electric device with power in a wireless manner has increased efficiency and become practical. Thus, it may be anticipated that the power obtained through energy harvesting be applied to contactless power supply.

When the power obtained through energy harvesting is applied to contactless power supply, for the contactless power supply to be practical, there is a need for the minimum output enabling at least an LED light, a buzzer, or the like to be driven (i.e., voltage of several V or greater input to a load and output obtaining power of 10 mW or greater).

Non-patent document 1 reports a study case in which the power supplied by a solar battery is stored in a rechargeable battery to perform contactless power supply using a stable DC voltage of 3 V is carried out. Non-patent document 1 shows, with a graph, the result in which the output voltage is about 4.5 V at a load of 180 ohms when the coil size of a primary coil (secondary coil also has the same dimension as the primary coil) is 38 mm×19 mm and the gap between coils is 2.6 mm.

The output power in this case is not described in non-patent document 1 but may be estimated through calculation as being 0.11 W (4.5×4.5/180).

The output power is the power enabling for the activation of an LED light or the like. However, the gap in this example is 2.6 mm and small. Accordingly, it may be understood that the system in this example does not enable the supply of power to a device separated by a large distance of a few centimeters to tens of centimeters. Non-patent document 1 uses a solar battery that supplies fluctuating power. However, the supplied power is temporarily stored in a rechargeable battery so that the rechargeable battery is able to supply stable voltage. The voltage supplied from the rechargeable battery is 3 V and low but sufficient for driving a circuit.

PRIOR ART DOCUMENT

Non-Patent Document

Non-Patent Document 1: Kanai et al., "Non-contact Power-Supply System Powered by Solar Cells", The Institute of Electronics Information and Communication Engineers, Technical Report of IEICE, EE98-47, OFT 98-40 (1998-10).

SUMMARY OF THE INVENTION

A constant-voltage source capable of providing a stable voltage is generally used as the input power of a contactless power supply system. The output voltage obtained using natural energy or human powered generation is low and greatly fluctuates. Thus, to actually operate an electric device using natural energy or human powered generation, there is a need to store power in a rechargeable battery to ensure that the power supply allows for stable voltage to be provided.

The human powered generation and small scale natural energy generation supplies voltage for a short period of time. The supplied voltage is low and greatly fluctuates. Accordingly, there have been no proposals for a contactless power supply technique and techniques applying contactless power supply capable of supplying power of several tens of mW or greater for cases in which the distance between the primary coil and the secondary coil is a few millimeters to a several tens of centimeters.

It is an object of the present invention to provide a method for driving a contactless power supply device, a contactless power supply device, and a contactless power supply system that perform contactless power supply to an electric device using a power generating device that generates unstable low voltage and low power through living activities and natural energy.

Means for Solving the Problems

A first aspect of the present invention provides a method for driving a contactless power supply device that supplies power to an electronic device including a secondary coil and a load. The contactless power supply device includes a primary coil and a high frequency inverter. The high frequency inverter supplies high frequency current to the primary coil to generate an alternating magnetic field. The alternating magnetic field generates an induced electromotive force at the secondary coil, and the load is driven using the electromotive force. The method includes connecting a resonance capacitor to the primary coil, connecting a fluctuating voltage power generating device to the high frequency inverter, and performing an inverter operation with the high frequency inverter using a fluctuating voltage generated by the fluctuating voltage power generating device.

Preferably, the fluctuating voltage power generating device includes at least one of a power generating device that generates power with human power and a power generating device that generates power with natural energy.

Preferably, the power generating device that generates power with human power is a power generating device that generates power with human power related to a living activity of a person.

A second aspect of the present invention is a contactless power supply device that supplies power to an electronic device including a secondary coil and a load. The contactless power supply device includes a primary coil and a high frequency inverter. The high frequency inverter supplies high frequency current to the primary coil to generate an alternating magnetic field, the alternating magnetic field generates an induced electromotive force at the secondary coil, and the load of the electric device is driven using the electromotive force. The contactless power supply device includes a fluctuating voltage power generating device that is connected to the high frequency inverter and generates a fluctuating voltage used by the high frequency inverter to perform an inverter operation.

Preferably, the high frequency inverter includes a resonance capacitor connected to the primary coil, and the high frequency inverter is a voltage resonance type inverter.

Preferably, the high frequency inverter is a self-excitation voltage resonance type high frequency inverter.

Preferably, the high frequency inverter includes a switching element that generates a flow of current to the primary coil, and the switching element is a single-transistor voltage resonance type high frequency inverter.

Preferably, the high frequency inverter includes a switching element that generates a flow of current to the primary coil, and the switching element is a bipolar transistor.

Preferably, the fluctuating voltage power generating device includes at least one of a power generating device that generates power with human power and a power generating device that generates power with natural energy.

Preferably, the power generating device that generates power with human power is a power generating device that generates power with human power related to a living activity of a person.

Preferably, the contactless power supply device includes a power plug and a second fluctuating voltage power generating device that is connected to the power plug and supplies the high frequency inverter with a fluctuating voltage for operating the high frequency inverter through the power plug.

A third aspect of the present invention is a contactless power supply system provided with a contactless power supply device including a primary coil and a high frequency inverter. The high frequency inverter supplies high frequency current to the primary coil to generate an alternating magnetic field. An electric device includes a secondary coil, a power receiving circuit, and a load. The alternating magnetic field generates an induced electromotive force at the secondary coil. The electromotive force is supplied to the load through the power receiving circuit. The load is driven by the supplied electromotive force. The contactless power supply device includes a fluctuating voltage power generating device that is connected to the high frequency inverter and generates a fluctuating voltage used by the high frequency inverter to perform an inverter operation.

Preferably, at least one of the primary coil and the secondary coil is connected to a resonance capacitor, and the high frequency inverter is a voltage resonance type inverter.

Preferably, the high frequency inverter is a self-excitation voltage resonance type high frequency inverter.

Preferably, the high frequency inverter includes a switching element that generates a flow of current to the primary coil, and the switching element is a single-transistor voltage resonance type high frequency inverter.

Preferably, the fluctuating voltage power generating device includes at least one of a power generating device that generates power with human power and a power generating device that generates power with natural energy.

Preferably, the power generating device that generates power with the human power is a power generating device that generates power with human power related to a living activity of a person.

Preferably, the contactless power supply system further includes a structural object through which an alternating magnetic field passes. The contactless power supply device and the electric device are arranged on opposite sides of the structural object, and the primary coil of the contactless power supply device is arranged facing the secondary coil of the electric device.

Preferably, the contactless power supply device includes a first housing and the electric device includes a second housing, the contactless power supply device and the electric device are integrated so that the first and second housings overlap, and the primary coil of the contactless power supply device and the secondary coil of the electric device are arranged to face each other through the first and second housings.

Preferably, the contactless power supply device includes a power plug, and a second fluctuating voltage power generating device that is connected to the power plug and supplies a fluctuating voltage for operating the high frequency inverter to the high frequency inverter through the power plug.

Effect of the Invention

The present invention to provide a method for driving a contactless power supply device, a contactless power supply device, and a contactless power supply system that perform contactless power supply to an electric device using a power generating device that generates unstable low voltage and low power through living activities and natural energy.

EMBODIMENTS OF THE INVENTION

First Embodiment

A power supply device of a contactless power supply system according to a first embodiment of the present invention will now be described with reference to the drawings.

Figure 1:
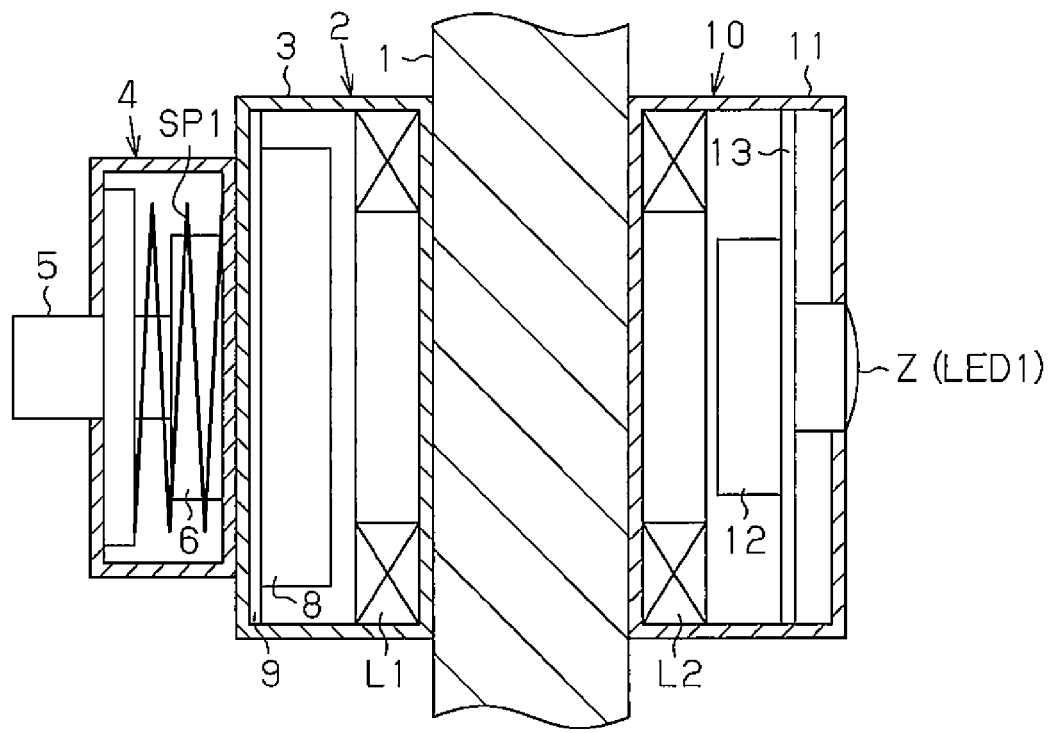
FIG. 1 is a cross-sectional view of a power supply device and an electric device of a contactless power supply system according to a first embodiment of the present invention.

As shown in FIG. 1, a contactless power supply device (hereinafter referred to as a power supply device) 2 is arranged on one side of a wall 1 through which an alternating magnetic field passes. A push-type power generating device 4 is arranged on a front outer surface of a housing 3 of the power supply device 2. The push-type power generating device 4 includes a push button 5, a spring SP1, and a piezoelectric element 6. The push button 5 is an automatic return type push button and is constantly pushed away from the power supply device 2 by the spring SP1. When pushed against the elastic force of the spring SP1, the push button 5 pushes the piezoelectric element 6, which is located on an inner surface proximal to the power supply device 2 of the push-type power generating device 4. The piezoelectric element 6 generates voltage (fluctuating voltage Vt) corresponding to the pushing force of the push button 5.

A high frequency inverter 8 and a primary coil L1 are arranged in the housing 3 of the power supply device 2. The high frequency inverter 8 is mounted on a substrate 9, and is configured to excite the primary coil L1 with the voltage (fluctuating voltage Vt) provided from the piezoelectric element 6 to generate an alternating magnetic field. The primary coil L1 is fixed on an inner wall of the housing 3 that is proximal to the wall 1 and through which the alternating magnetic field passes. In detail, the primary coil L1 is fixed to so that a coil surface of the primary coil L1 is parallel to the wall 1.

An electric device 10 (lighting device in the present embodiment) that receives secondary power from the power supply device 2 is fixed so that a housing 11 of the electric device 10 and the housing 3 of the power supply device 2 is located on opposite sides of the wall 1. The electric device 10 includes a secondary coil L2, a power receiving circuit 12, and a load (light emitting diode LED1) Z.

The secondary coil L2 is fixed to an inner wall of the housing 11 that is proximal to the wall 1 and through which the alternating magnetic field passes. In detail, the secondary coil L2 is fixed so that a coil surface of the secondary coil L2 is parallel to the wall 1.

The power receiving circuit 12 is mounted on a substrate 13 arranged in the housing 11. The load (light emitting diode LED1) Z is mounted on the substrate 13, and a distal end portion of the load projects out of the housing 11.

The secondary coil L2 generates secondary power with the alternating magnetic field from the primary coil L1. The secondary power generated by the secondary coil L2 is provided to the power receiving circuit 12. The power receiving circuit 12, which is formed by a rectifying circuit, rectifies the secondary power received from the secondary coil L2, converts the power to DC voltage, and supplies the DC voltage to the load (light emitting diode LED1) Z of the electric device (lighting device) 10 to generate light with the light emitting diode LED1.

Figure 2:
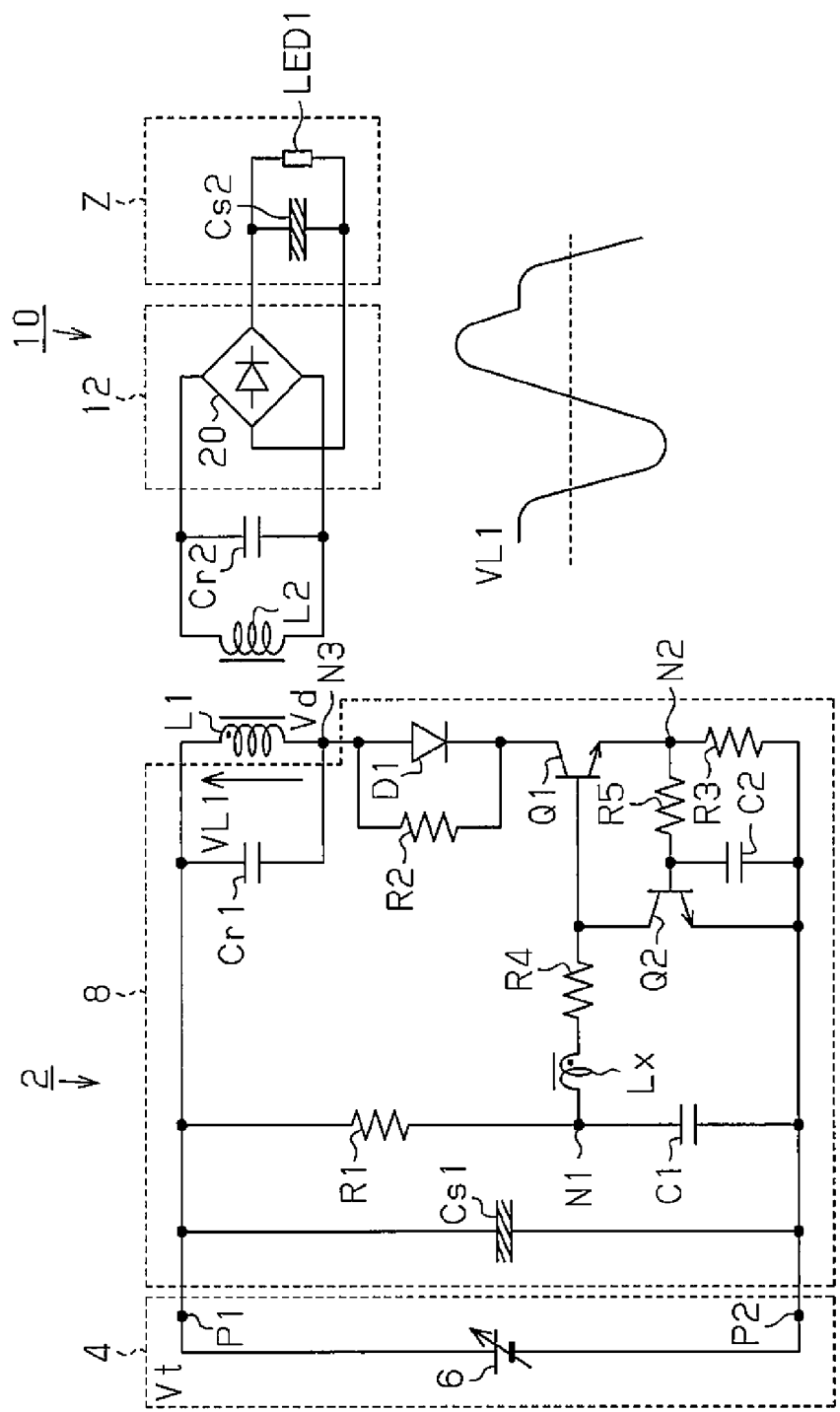
FIG. 2 is an electric circuit diagram showing an electrical configuration of the power supply device and the electric device of the contactless power supply system according to the present invention.

The electrical configuration of the power supply device 2 and the electric device 10 will now be described with reference to FIG. 2.

The piezoelectric element 6 arranged in the push-type power generating device 4 of the power supply device 2 is connected to the high frequency inverter 8. The piezoelectric element 6 provides the fluctuating voltage Vt, which is generated when the push button 5 is pushed, to the high frequency inverter 8.

Even if the piezoelectric element 6 is continuously pushed by the push button 5, the fluctuating voltage Vt generated by the piezoelectric element 6 converges to zero after a predetermined time (about 350 ms) elapses from when the piezoelectric element 6 is pushed. In detail, an initial voltage of the fluctuating voltage Vt generated by the piezoelectric element 6 has a value within a range from 1.2 V to 1.8 V according to the pushing force of the push button 5, and such fluctuating voltage Vt converges from the initial voltage to zero with time.

Accordingly, when the push button 5 is pushed, the piezoelectric element 6 provides the high frequency inverter 8 with a fluctuating voltage Vt in the range of 1.2 V to 1.8 V. That is, the push-type power generating device 4 may be referred to as a fluctuating voltage power generating device that generates a fluctuating low voltage.

The high frequency inverter 8 is an inverter that uses the fluctuating voltage Vt from the piezoelectric element 6 as a drive source so that current having a high frequency of several tens of kHz flows to excite the primary coil L1. The high frequency inverter 8 of the present embodiment adopts a configuration that is basically the same as the switching power circuit referred to as a self-excitation single transistor voltage resonant type inverter disclosed in Japanese Patent No. 3391999.

The high frequency inverter 8 includes a primary side smoothing capacitor Cs1 connected between a positive terminal P1 and a negative terminal P2 of the piezoelectric element 6 to smoothen the fluctuating voltage Vt from the piezoelectric element 6. The high frequency inverter 8 also includes a series circuit in which a first resistor R1 and a first charging/discharging capacitor C1 are connected in series. The series circuit is connected in parallel to the primary side smoothing capacitor Cs1.

Accordingly, when the fluctuating voltage Vt is provided from the piezoelectric element 6, the fluctuating voltage Vt is smoothed by the primary side smoothing capacitor Cs1. The smoothed fluctuating voltage Vt is charged in the first charging/discharging capacitor C1 through the first resistor R1.

The high frequency inverter 8 includes a primary side resonance capacitor Cr1 connected in parallel to the primary coil L1. The primary side resonance capacitor Cr1 and the primary coil L1 configure an LC resonance circuit.

A parallel circuit of the primary coil L1 and the primary side resonance capacitor Cr1 has a positive terminal is connected to the positive terminal P1 of the piezoelectric element 6. Further, the parallel circuit of the primary coil L1 and the primary side resonance capacitor Cr1 has a negative terminal connected in series to a parallel circuit in which a diode D1 and a second resistor R2 are connected in parallel.

The diode D1 includes an anode terminal and a cathode terminal. The anode terminal is connected to the primary coil L1, and the cathode terminal is connected to a collector terminal of a first bipolar transistor Q1, which is a switching element.

An emitter terminal of the first bipolar transistor Q1 is connected to the negative terminal P2 of the piezoelectric element 6 by a third resistor R3. A series circuit, in which a feedback coil Lx and a fourth resistor R4 are connected in series, is connected between a base terminal of the first bipolar transistor Q1 and a connecting point (node N1) between the first resistor R1 and the first charging/discharging capacitor C1. The feedback coil Lx and the primary coil L1 form a resonance transformer.

Accordingly, when the charging voltage of the first charging/discharging capacitor C1 is increased to a turn ON threshold value voltage (0.7 V) of the first bipolar transistor Q1, the first bipolar transistor Q1 is turned ON. The first bipolar transistor Q1 is also turned ON when a positive electromotive force is induced toward the feedback coil Lx at the side of the fourth resistor R4. A current flows to the primary coil L1 when the first bipolar transistor Q1 is turned ON.

The base terminal of the first bipolar transistor Q1 is connected to the negative terminal P2 of the piezoelectric element 6 by a second bipolar transistor Q2. In detail, the second bipolar transistor Q2 includes a collector terminal and an emitter terminal. The collector terminal is connected to the base terminal of the first bipolar transistor Q1 and the emitter terminal is connected to the negative terminal P2 of the piezoelectric element 6.

The base terminal of the second bipolar transistor Q2 is connected to a connecting point (node N2) between the emitter terminal of the first bipolar transistor Q1 and the third resistor R3 by a fifth resistor R5. The base terminal of the second bipolar transistor Q2 is also connected to the negative terminal P2 of the piezoelectric element 6 by a second charging/discharging capacitor C2.

Accordingly, when the first bipolar transistor Q1 is turned ON and current flows to the primary coil L1, and the charging voltage of the second charging/discharging capacitor C2 is increased to a turn ON threshold value voltage (0.7 V) of the second bipolar transistor Q2, the second bipolar transistor Q2 is turned ON. When the second bipolar transistor Q2 is turned ON, the base-emitter voltage of the first bipolar transistor Q1 becomes lower than the turn ON threshold value voltage, and the first bipolar transistor Q1 is turned OFF.

The operation of the electric circuit of the power supply device 2 will now be described.

When the fluctuating voltage Vt is provided from the piezoelectric element 6, the fluctuating voltage Vt is smoothed by the primary side smoothing capacitor Cs1. The fluctuating voltage Vt smoothed by the primary side smoothing capacitor Cs1 charges the first charging/discharging capacitor C1 and is applied to the resonance circuit including the primary coil L1 and the primary side resonance capacitor Cr1.

The charging voltage of the first charging/discharging capacitor C1 is applied to the base terminal of the first bipolar transistor Q1 through the feedback coil Lx and the fourth resistor R4. When the charging voltage of the first charging/discharging capacitor C1 reaches the threshold value voltage (0.7 V) of the first bipolar transistor Q1, the first bipolar transistor Q1 is turned ON. Current flows to the primary coil L1 when the first bipolar transistor Q1 is turned ON.

As a result, current flows to the third resistor R3, the second charging/discharging capacitor C2 is charged, and the base voltage of the second bipolar transistor Q2 rises. When the charging voltage of the second charging/discharging capacitor C2 increases and the second bipolar transistor Q2 is turned ON, the first bipolar transistor Q1 is turned OFF.

When the first bipolar transistor Q1 is turned OFF, the excitation energy of the primary coil L1 starts to move toward the primary side resonance capacitor Cr1. The movement of the energy starts resonance (oscillation), and the resonance circuit generates resonance voltage. In other words, the excitation energy of the primary coil L1 moves to the primary side resonance capacitor Cr1, and the movement sinusoidally increase the voltage Vd at a connecting point (node N3) between the primary coil L1 and the diode D1. The voltage Vd becomes maximal at a time point in which the movement of the excitation energy from the primary coil L1 to the primary side resonance capacitor Cr1 is completed.

When the voltage Vd fluctuates, the primary coil L1 is negatively excited, and the negative electromotive force is induced to the feedback coil Lx. This applies inverted voltage from the feedback coil Lx and sinusoidally decreases the base voltage at the first bipolar transistor Q1. When the movement of the excitation energy from the primary coil L1 to the primary side resonance capacitor Cr1 is completed, the moved energy starts to return from the primary side resonance capacitor Cr1 to the primary coil L1, and the voltage Vd sinusoidally decreases as the energy returns to the primary coil L1.

When the voltage Vd fluctuates, the primary coil L1 is postively excited, and the positive electromotive force is induced to the feedback coil Lx. This applies positive from the feedback coil Lx and sinusoidally increases the base voltage at the first bipolar transistor Q1. When the base voltage of the first bipolar transistor Q1 reaches the turn ON threshold value (0.7 V), the first bipolar transistor Q1 is turned ON. When the first bipolar transistor Q1 is turned ON, collector current flows, the second charging/discharging capacitor C2 is charged, and the base voltage of the second bipolar transistor Q2 increases.

When the base voltage of the second bipolar transistor Q2 eventually reaches the turn ON threshold value (0.7 V), the second bipolar transistor Q2 is turned ON and the first bipolar transistor Q1 is turned OFF. When the first bipolar transistor Q1 is turned OFF, the excitation energy of the primary coil L1 starts to move again to the primary side resonance capacitor C1. Further, the primary coil L1 is negatively excited and the negative electromotive force is induced to the feedback coil Lx.

This applies negative voltage from the feedback coil Lx, and the base voltage of the first bipolar transistor Q1 sinusoidally decreases.

The discharging of the second charging/discharging capacitor C2 starts when the first bipolar transistor Q1 is turned OFF. The second bipolar transistor Q2 is then turned OFF.

Subsequently, when the movement of the excitation energy of the primary coil L1 from the primary coil L1 to the primary side resonance capacitor Cr1 is completed, the moved energy starts to return from the primary side resonance capacitor Cr1 to the primary coil L1. As the energy returns to the primary coil L1, the voltage Vd sinusoidally decreases, and the primary coil L1 is positively excited to induce the positive electromotive force to the feedback coil Lx.

Thus, the positive voltage is applied from the feedback coil Lx to the first transistor Q1, and the base voltage of the first transistor Q1 sinusoidally increases. When the base voltage reaches the turn ON threshold value, the first bipolar transistor Q1 is turned ON.

Then, the inverter operation is repeated in the same manner as described above. Thus, the primary coil L1 is excited and the alternating magnetic field is radiated toward the secondary coil L2 of the electric device 10 by repeating the inverter operation.

In order to repeat the inverter operation, the voltage that excites the primary coil L1 based on the fluctuating voltage Vt from the piezoelectric element 6 of the push-type power generating device 4 needs to be held in the primary side smoothing capacitor Cs1 in the present embodiment.

The high frequency inverter 8 can operate as an inverter if a voltage exceeding the threshold value voltage (0.7 V) of the small first bipolar transistor Q1 is input to the base terminal of the first bipolar transistor Q1. Therefore, when the fluctuating voltage Vt provided from the piezoelectric element 6 according to one push operation of the push button 5 is a voltage exceeding the threshold value voltage, the high frequency inverter 8 can perform the inverter operation by setting the capacitance of the primary side smoothing capacitor Cs1 to an optimum value.

A secondary side resonance capacitor Cr2 is connected in parallel to the secondary coil L2 of the electric device 10. The secondary coil L2 supplies secondary power with the alternating magnetic field from the primary coil L1 of the power supply device 2. The secondary coil L2 is connected to the power receiving circuit 12. The power receiving circuit 12 includes a full-wave rectifying circuit 20 including a diode bridge circuit.

The full-wave rectifying circuit 20 rectifies the secondary power received from the secondary coil L2, and supplies the rectified DC voltage to the load Z in which the secondary side smoothing capacitor Cs2 and the light emitting diode LED1 are connected in parallel. Thus, the light emitting diode LED1 emits light.

The light emitting diode LED1 may emit light for a long period by setting the capacitance of the secondary side smoothing capacitor Cs2 to an optimum value.

The operation of the contactless power supply system will now be described.

When the push button 5 of the push-type power generating device 4 integrated with the power supply device 2 arranged on one side surface of the wall 1 is pushed, the piezoelectric element 6 continuously supplies the fluctuating voltage Vt corresponding to the pushing state to the high frequency inverter 8.

In this case, the fluctuating voltage Vt from the piezoelectric element 6 is smoothed by the primary side smoothing capacitor Cs1 and provided to the high frequency inverter 8. The charging voltage of the first charging/discharging capacitor C1 is increased by the smoothed fluctuating voltage Vt. The charging voltage is applied to the base terminal of the first bipolar transistor Q1 through the feedback coil Lx and the fourth resistor R4. When the charging voltage of the first charging/discharging capacitor C1 reaches the turn ON threshold value voltage of the first bipolar transistor Q1, the first bipolar transistor Q1 is turned ON. Current flows to the primary coil L1 by turning ON of the first bipolar transistor Q1.

When current flows to the primary coil L1 (first bipolar transistor Q1), the second charging/discharging capacitor C2 is charged, and the base voltage of the second bipolar transistor Q2 rises. When the second bipolar transistor Q2 is eventually turned ON and the first bipolar transistor Q1 is turned OFF, the excitation energy of the primary coil L1 starts to move to the primary side resonance capacitor Cr1 thus starting resonance (oscillation), and the resonance voltage is generated in the resonance circuit.

The first bipolar transistor Q1 is ON/OFF controlled by the induced electromotive force of the feedback coil Lx based on the movement of the excitation energy of the primary coil L1 and the ON/OFF of the second bipolar transistor Q2. That is, the resonance circuit is resonated and the primary coil L1 is excited by ON/OFF controlling the first bipolar transistor Q1.

When current flows and excites the primary coil L1, the induced electromotive force is generated in the secondary coil L2 of the electric device 10 through the alternating magnetic field generated from the primary coil L1. The induced electromotive force generated in the secondary coil L2 is rectified by the full-wave rectifying circuit 20 of the power receiving circuit 12, and the DC voltage of which is applied to the light emitting diode LED1. The light emitting diode LED1 thus emits light with DC voltage.

The contactless power supply system of the first embodiment has the following effects.

(1) In the first embodiment, the power supply device 2 acquires the power (fluctuating voltage Vt) that excites the primary coil L1 by simply pushing the push button 5 of the push-type power generating device 4, and the power is supplied to the secondary coil L2 of the electric device 10 arranged on a surface opposite to the surface of the wall 1 on which the power supply device 2 is arranged even if the power supply device 2 and the electric device 10 are not in contact. The electric device 10 emits light from the light emitting diode LED1 with the secondary power obtained in the secondary coil L2 by the contactless power supply.

Accordingly, the light emitting diode LED 1 emits light without costing any electric fees by simply pushing the push button 5. This is very economical. Further, since the power (fluctuating voltage Vt) is obtained by simply pushing the push button 5, carbon dioxide ($CO_2$) is not emitted. This is friendly to the environment.

(2) In the first embodiment, power is supplied from the power supply device 2 to the electric device 10 even if the power supply device 2 and the electric device 10 are not in contact. Thus, the primary coil L1 of the power supply device 2 and the secondary coil L2 of the electric device 10 only need to be arranged on opposite sides of the wall 1. Thus, troublesome electric wiring and coupling tasks performed after removing the wall 1 are not necessary. Further, in the present example, the power supply device 2 and the electric device 10 may be used by simply coupling the housings 3 and 11 to the surface of the wall 1 with double-sided adhesive tape or the like. Thus, the wall 1 is kept clean without being damaged.

(3) In the first embodiment, the first bipolar transistor Q1 causes the operation high frequency inverter 8 to perform the inverter operation when the base voltage exceeds about 0.7 V, which is the threshold value voltage. Therefore, the power supply device 2 is operated even at the very low fluctuating voltage Vt of about 1.2 V, and the light emitting diode LED1 of the electric device 10 emits light.

(4) In the first embodiment, the high frequency inverter 8 is a voltage resonance type inverter. Therefore, the inter-terminal voltage VL1 of the primary coil L1 is increased.

Further, the energy stored in the resonance circuit including the primary coil L1 and the primary side resonance capacitor Cr1 is prevented from being regenerated toward the power by arranging the diode D1 between the first bipolar transistor Q1 and the primary coil L1.

Accordingly, even if the power for supplying the fluctuating voltage Vt, which fluctuates and is low, is used in the power supply device 2, the power supply device 2 forms the waveform of the inter-terminal voltage VL1 of the primary coil L1 so as to have a greater amplitude and to become closer to a sine wave.

As a result, a large induced voltage is generated in the secondary coil L2, and the voltage is increased by the parallel resonance circuit including the secondary coil L2 and the secondary side resonance capacitor Cr2 connected in parallel to the secondary coil L2. Therefore, the inter-terminal voltage of the secondary coil L2 is increased. In other words, the necessary voltage is applied to the load Z even if the gap between the primary coil L1 and the secondary coil L2 is large, and the power may be consumed.

Moreover, since the inter-terminal voltage VL1 of the primary coil L1 has a voltage waveform close to the sine wave, the primary coil L1 may radiate an alternating magnetic field including a small amount of noise. This ensures that the electric device 10 properly operates.

The high frequency inverter 8 is a voltage resonance type inverter of a self-excitation type single-transistor (first bipolar transistor Q1). Thus, a compact and low-cost contactless power supply system capable of being oscillated with few components may be realized.

(5) In the first embodiment, the secondary coil L2 reduces the impedance connected in parallel to the secondary side resonance capacitor Cr2 and increases the equivalent secondary voltage of the secondary coil L2. As a result, in the contactless power supply, even if the power for supplying the fluctuating voltage Vt, which fluctuates and is low, is used in the power supply device 2, high voltage is supplied to the electric device 10, and the electric device 10 is operated in a reliable manner.

The first embodiment may be modified as described below.

In the first embodiment, the push-type power generating device 4, which is a push-type power generating mechanism, is arranged in the power supply device 2, and the fluctuating voltage Vt is obtained from the piezoelectric element 6 by continuously pushing the push button 5 of the push-type power generating device 4 intermittently.

Figure 3:
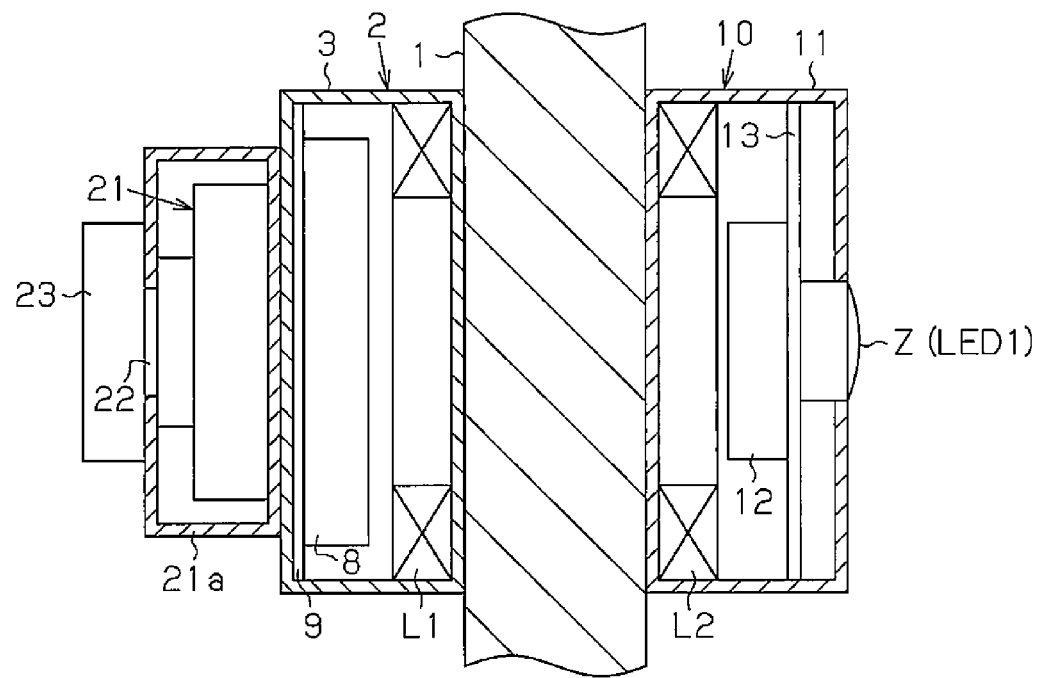
FIG. 3 is a cross-sectional view of a power supply device and an electric device showing another example of the first embodiment of the present invention.

Alternatively, referring to FIG. 3, a dynamo 21, which is a rotary type power generating mechanism, may be arranged in the power supply device 2 as the fluctuating power generating device. In detail, a housing 21a of the dynamo 21 is attached to the outer side surface of the front surface of the housing 3 of the power supply device 2. A distal end portion of a rotation shaft 22 of the dynamo 21 projects out of the front surface of the housing 21a, and a rotation operation knob 23 is fixed to the projecting portion. The rotation shaft 22 is rotatably operated by the rotation operation knob 23.

Thus, when an operation for rotating the rotation operation knob 23 in one direction is carried out, the rotation shaft 22 is rotated, and the dynamo 21 generates the fluctuating voltage Vt. In the same manner as the first embodiment, the fluctuating voltage Vt obtained by the dynamo 21 excites the primary coil L1 of the power supply device 2, generates the secondary power in the secondary coil L2 of the electric device 10, and causes the light emitting diode LED1 to emit light with the secondary power.

In the dynamo 21, the direction of the fluctuating voltage Vt is changed by the rotating direction of the rotation operation knob 23. Thus, a one-way clutch needs to be arranged so that the dynamo 21 is rotatable in only one direction. When there is a need to rotate the rotation operation knob 23 in two directions, a rectifying circuit including a diode bridge and the like needs to be arranged at the pre-stage of the primary side smoothing capacitor Cs1 in the power supply device 2.

Figure 4:
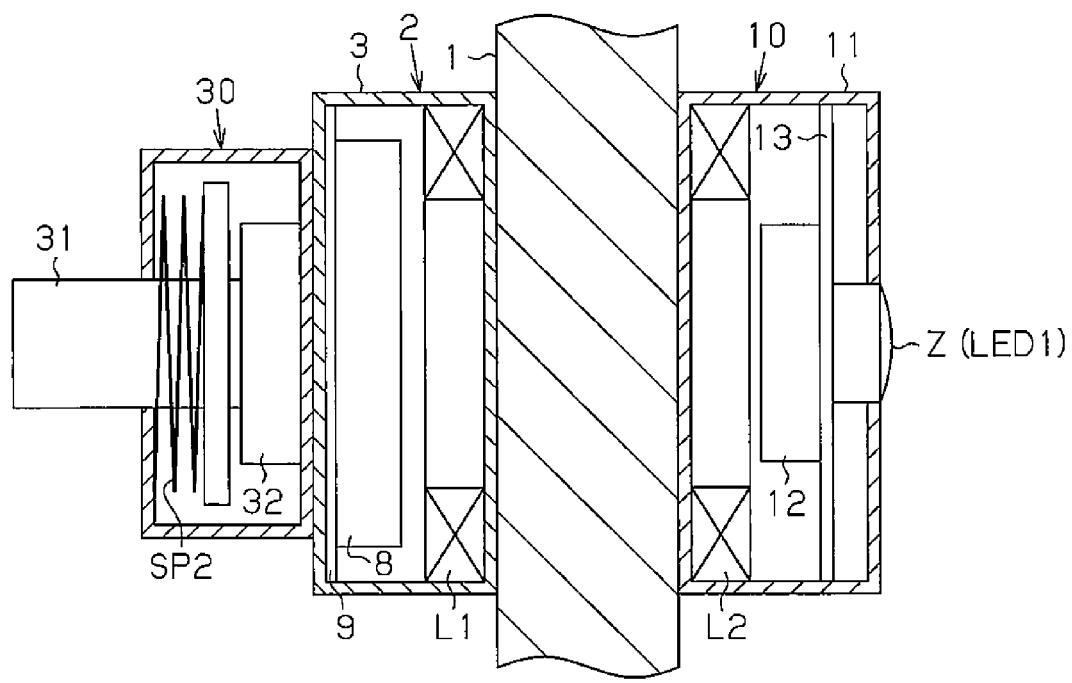
FIG. 4 is a cross-sectional view of a power supply device and an electric device showing a further example of the first embodiment of the present invention.

Further, as shown in FIG. 4, a pull-type power generating device 30, which is a pull-type power generating mechanism, may be arranged in the power supply device 2. In detail, the pull-type power generating device 30 is arranged on the outer side surface of the front surface of the housing 3 of the power supply device 2. The pull-type power generating device 30 includes an operation lever 31, a spring SP2, and a piezoelectric element 32. The operation lever 31 is an automatic return type operation lever, and is constantly pushed in the direction of the power supply device 2 by the spring SP2. The piezoelectric element 32 arranged in the pull-type power generating device 30 is pulled away from the power supply device 2 by pulling the operation lever 31 away from the power supply device 2 against the elastic force of the spring SP2. The piezoelectric element 32 supplies the fluctuating voltage Vt corresponding to the pull force of the operation lever 31.

In the same manner as the first embodiment, the fluctuating voltage Vt obtained by the piezoelectric element 32 excites the primary coil L1 of the power supply device 2, generates the secondary power in the secondary coil L2 of the electric device 10, and causes the light emitting diode LED1 to emit light with the secondary power.

When the pull-type power generating mechanism is used, the fluctuating voltage Vt can be acquired by pulling the pull-type power generating mechanism with a cord or the like.

Further, a permanent magnet may be arranged in the coil, and the permanent magnet may be mechanically coupled to a switching switch to reciprocate the permanent magnet in the coil with a switching operation of the switching switch to arrange a power generating device, which generates induced electromotive force at a coil, in the power supply device 2.

Second Embodiment

A contactless power supply system according to a second embodiment of the present invention will now be described with reference to FIG. 5 and FIG. 6.

The present embodiment has a feature in a means for acquiring power (fluctuating voltage Vt) of the power supply device 2. Thus, the portion including this feature will now be described.

Figure 5:
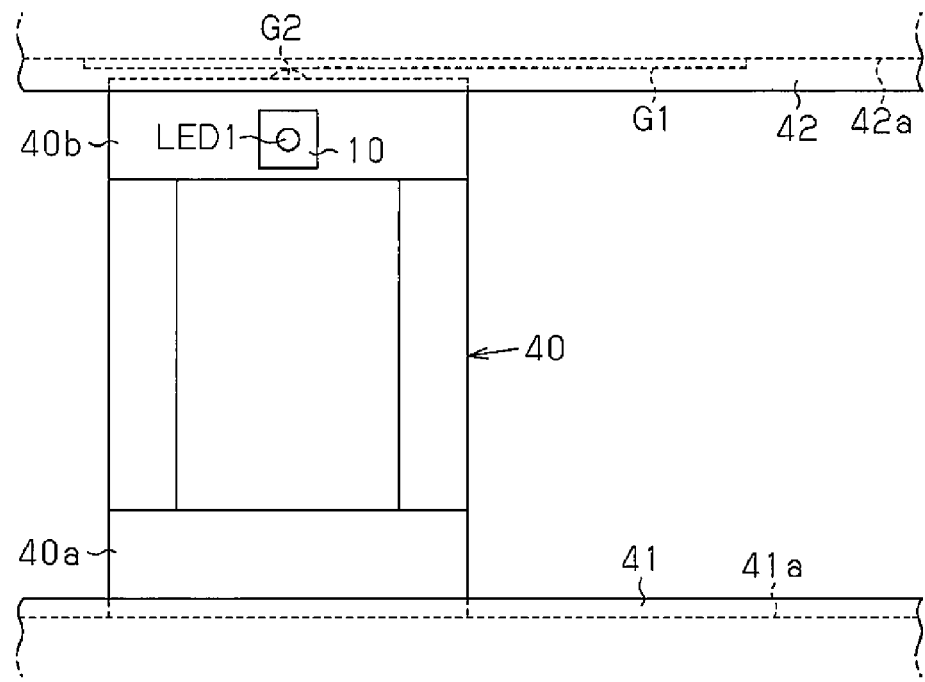
FIG. 5 is a front view showing a contactless power supply system according to a second embodiment of the present invention.

As shown in FIG. 5, a sliding door 40 through which the alternating magnetic field passes is arranged between a doorsill 41 and a door header 42. A lower ledge 40a of the sliding door 40 is fitted into a groove 41a formed in the doorsill 41, and an upper ledge 40b of the sliding door 40 is fitted into a groove 42a formed in the door header 42. The sliding door 40 can reciprocate along the grooves 41a and 42a between the doorsill 41 and the door header 42.

Figure 6:
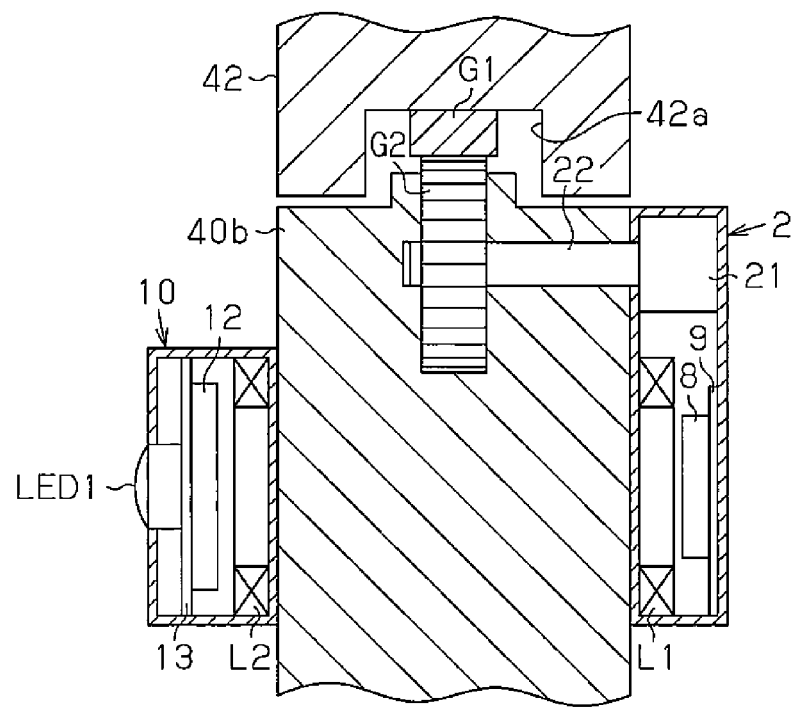
FIG. 6 is a cross-sectional view of main parts illustrating the contactless power supply system according to the second embodiment of the present invention.

As shown in FIG. 6, a rack gear G1 is fixed along the groove 42a in the groove 42a of the door header 42.

As shown in FIG. 6, the power supply device 2 is arranged at a central position of the upper part of one side of the upper ledge 40b of the sliding door 40. The dynamo 21, which is a rotary type power generating mechanism, is arranged in the housing 3 of the power supply device 2. The rotation shaft 22 projects from the main body of the dynamo 21 in the thickness direction of the upper ledge 40b to the central position of the thickness. A pinion gear G2, which is engaged with the rack gear G1 fixed in the groove 42a of the door header 42, is fixed to the distal end of the rotation shaft 22.

Therefore, when the sliding door 40 is reciprocated along the grooves 41a and 42a between the doorsill 41 and the door header 42, the pinion gear G2 is rotated and the rotation shaft 22 of the dynamo 21 is rotated. As a result, the dynamo 21 supplies the fluctuating voltage Vt when the rotation shaft 22 rotates.

The high frequency inverter 8 and the primary coil L1 are arranged on the lower side of the dynamo 21 in the housing 3 of the power supply device 2. The high frequency inverter 8 is mounted on the substrate 9 and is driven by the fluctuating voltage Vt input from the dynamo 21 to excite the primary coil L1.

The primary coil L1 is fixed to the inner wall of the housing 3, through which the alternating magnetic field passes, proximal to the upper ledge 40b. In detail, the primary coil L1 is fixed so that the coil surface of the primary coil L1 is parallel to the upper ledge 40b of the sliding door 40.

The direction of the fluctuating voltage Vt generated by the dynamo 21 differs between when the sliding door 40 move forth and when the sliding door 40 moves back. Thus, the pinion gear G2 needs to be rotated only by either one of the movements, the forward movement or the backward movement. Accordingly, the one-way clutch needs to be used. To enable both movement in the forward direction and the backward direction, the power supply device 2 needs a rectifying circuit including a diode bridge or the like in front of the primary side smoothing capacitor Cs1.

The electric device 10 that receives the secondary power from the power supply device 2 is fixed so that the housing 11 of the electric device 10 and the housing 3 of the power supply device 2 are arranged on opposite sides of the upper ledge 40b of the sliding door 40. The secondary coil L2 is fixed to the inner wall of the housing 11 of the electric device 10, through which the alternating magnetic field passes, proximal to the upper ledge 40b. In detail, the secondary coil L2 is fixed so that the coil surface of the secondary coil L2 is parallel to the upper ledge 40b and faces the primary coil L1.

The secondary coil L2 generates the secondary power with the alternating magnetic field from the primary coil L1 when the opposing primary coil L1 is excited. The secondary power generated in the secondary coil L2 is supplied to the power receiving circuit 12. The power receiving circuit 12 rectifies the secondary power received from the secondary coil L2, converts the power to DC voltage, and emits light from the light emitting diode LED1 of the electric device (lighting device) 10.

The second embodiment has the following advantage in addition to advantages (3) to (5) of the first embodiment.

(1) In the second embodiment, the power supply device 2 acquires the power (fluctuating voltage Vt) that excites the primary coil L1 by simply reciprocating the sliding door 40 along the grooves 41a and 42a between the doorsill 41 and the door header 42. The power supply device 2 supplies power to the secondary coil L2 of the electric device 10 arranged on the surface opposite to the surface of the sliding door 40 on which the power supply device 2 is arranged even if the power supply device 2 and the electric device 10 are not in contact. The electric device 10 thus causes the light emitting diode LED1 to emit light with the secondary power obtained in the secondary coil L2 by the contactless power supply.

The second embodiment may be modified as described below.

In the second embodiment, the contactless power supply system is applied to the sliding door 40 but may also be applied to a glass window, a slide-open door, a Fusuma door, a paper door, a glass door of a showcase, a partition panel, an accordion curtain, and the like.

In the second embodiment, the rotation shaft 22 of the dynamo 21 is rotated using the rack gear G1 and the pinion gear G2. Instead, the rack gear G1 and the pinion gear G2 may be omitted, and a rubber roller may be attached to the rotation shaft 22. When reciprocating the sliding door 40 between the doorsill 41 and the door header 42, the rubber roller attached to the rotation shaft 22 may contact the surface of the groove 42a of the door header 42 and rotate. This rotates the rotation shaft 22 of the dynamo 21 and acquires the fluctuating voltage Vt from the dynamo 21.

In this case, the rack gear G1 and the pinion gear G2 are not necessary. This reduces the number of components and facilitates construction.

Third Embodiment

A contactless power supply system according to a third embodiment of the present invention will now be described with reference to FIGS. 7 and 8.

The present embodiment has a feature in a means for acquiring power (fluctuating voltage Vt) of the power supply device 2 and a coupling structure of the power supply device 2 and the electric device 10. Thus, the portion having the feature will now be described.

Figure 7:
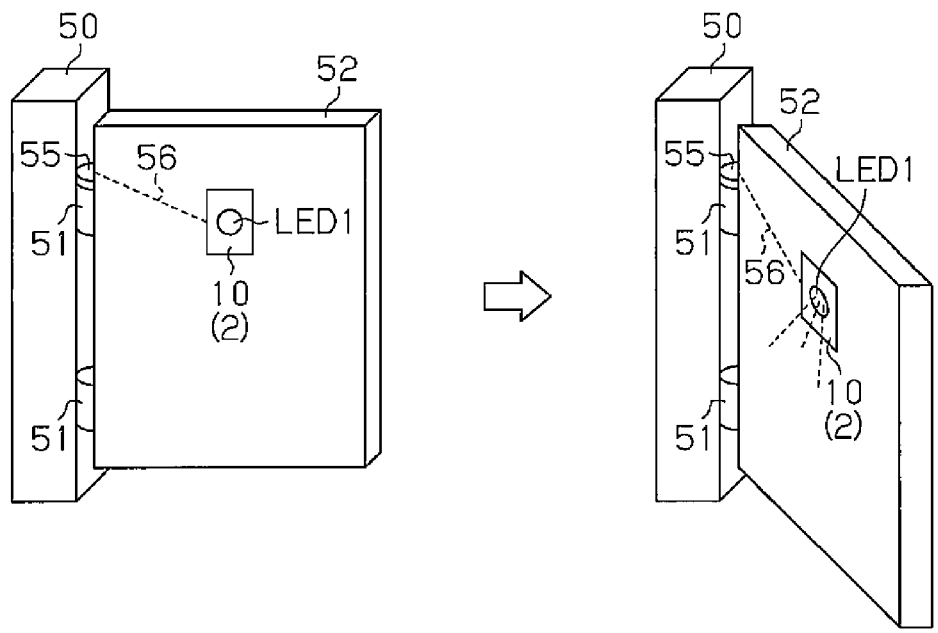
FIG. 7 is a perspective view showing a contactless power supply system according to a third embodiment of the present invention.
Figure 8:
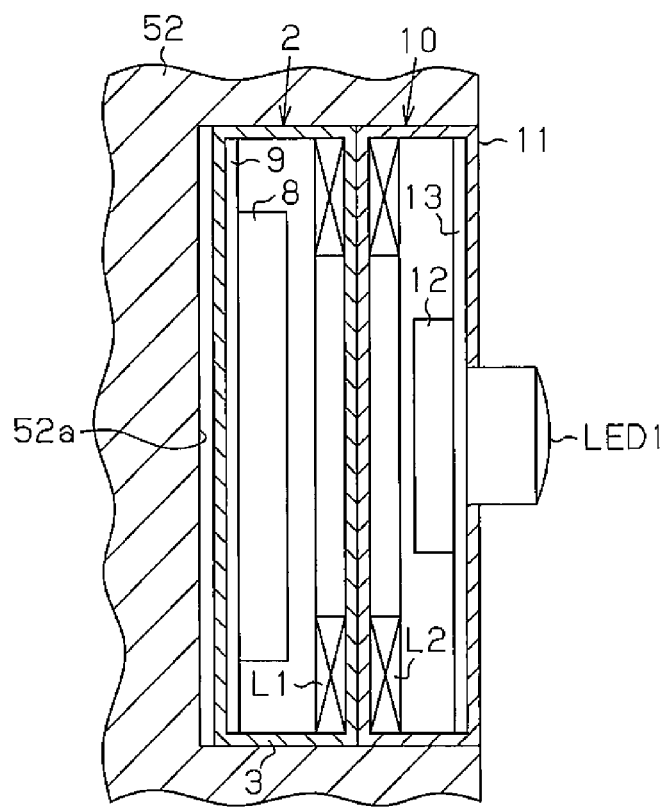
FIG. 8 is a cross-sectional view of main parts showing the contactless power supply system according to the third embodiment of the present invention.

As shown in FIG. 7, a door 52 is coupled to a gate post 50 and supported by a hinge 51. The hinge 51 includes a pillar plate (not shown) fixed to the gate post 50, a door plate (not shown) fixed to the door 52, and a coupling movable shaft (not shown) that is fixed to the pillar plate and pivotally supports the door plate. The door 52 is thus supported to open and close by pivoting about the hinge 51.

A power generating device 55 such as a dynamo and the like is arranged on the upper hinge 51. The power generating device 55 generates the fluctuating voltage Vt with the coupling movable shaft that rotates relative to the door plate when the door 52 opens or closes. In other words, the power generating device 55 is a fluctuating voltage power generating device.

The power supply device 2 and the electric device 10 are arranged on the front surface (may be the back surface) of the door 52. The power supply device 2 and the electric device 10 are accommodated in a recess 52a provided in the door 52 such that the housings 3 and 11 overlap, as shown in FIG. 8. In detail, the power supply device 2 is arranged at the rear of the recess 52a, and the electric device 10 is arranged proximal to the opening of the recess 52a.

In the power supply device 2, the high frequency inverter 8 is arranged on a surface separated from the electric device 10 in the housing 3, and the primary coil L1 is arranged on the inner wall surface of the housing 3 proximal to the electric device 10. The high frequency inverter 8 excites the primary coil L1 when the fluctuating voltage Vt is supplied from the power generating device 55 through the wiring 56.

The power generating device 55 needs to rotate the rotation shaft of the power generating device 55 by pivoting the door 52 in only one direction since the direction of the fluctuating voltage Vt is changed by the pivoting direction of the door 52. Therefore, a one-way clutch is necessary. To enable pivoting of the door 52 in two directions, the power supply device 2 needs the rectifying circuit including the diode bridge and the like in front of the primary side smoothing capacitor Cs1.

The electric device 10 is arranged on the inner wall of the housing 11 proximal to the power supply device 2 so that the secondary coil L2 faces the primary coil L1. The power receiving circuit 12 of the electric device 10 is mounted on the substrate 13 arranged in the housing 11, and the light emitting diode LED1 is mounted on the substrate 13 and includes a distal end portion projecting out of the housing 11.

The secondary coil L2 generates secondary power with the alternating magnetic field from the primary coil L1. The secondary power generated by the secondary coil L2 is supplied to the power receiving circuit 12. The power receiving circuit 12 includes the rectifying circuit. The power receiving circuit 12 rectifies the secondary power obtained in the secondary coil L2, converts the power to DC voltage, and emits light from the light emitting diode LED1 of the electric device 10.

The third embodiment has the following advantage in addition to advantages (3) to (5) of the first embodiment.

(1) In the third embodiment, the power supply device 2 acquires power (fluctuating voltage Vt) that excites the primary coil L1 by simply opening or closing the door 52. The power is supplied to the secondary coil L2 of the electric device 10 arranged on the front surface of the power supply device 2 even if the power supply device 2 and the electric device 10 are not in contact. Thus, the electric device 10 emits light from the light emitting diode LED1 to emit light with the secondary power obtained by the contactless power supply in the secondary coil L2.

Accordingly, using the energy generated by the motion of the door 52 pivoted by a person as a power source, the entrance of a person or the intrusion of a suspicious person can be detected.

The third embodiment may be modified as described below.

Figure 9:
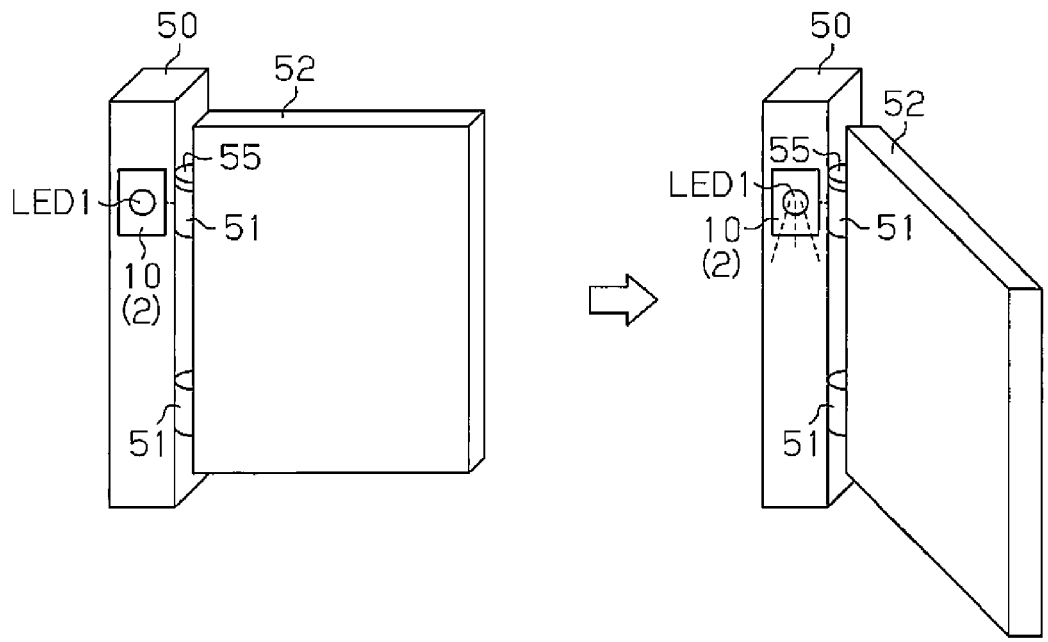
FIG. 9 is a perspective view showing another example of the third embodiment of the present invention.

In the third embodiment, the integrally configured power supply device 2 and electric device 10 are arranged on the door 52. However, the power supply device 2 and the electric device 10 may be arranged on the gate post 50, as shown in FIG. 9.

Figure 10:
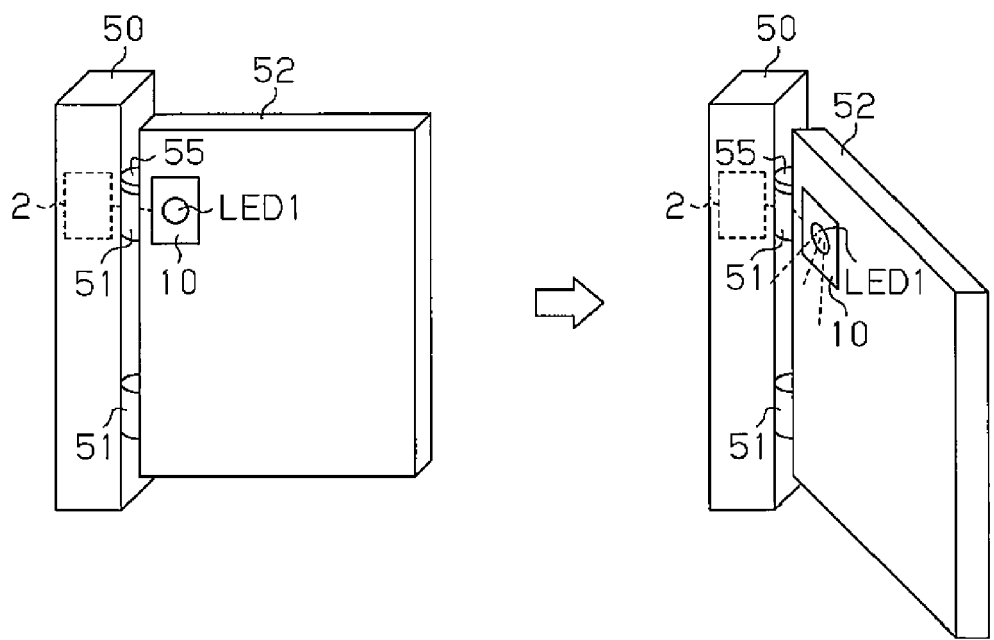
FIG. 10 is a perspective view showing another example of the third embodiment of the present invention.

Further, as shown in FIG. 10, the power supply device 2 may be arranged on the gate post 50, and the electric device 10 may be arranged on the door 52. In this case, when the door 52 is pivoted so that the electric device 10 approaches the power supply device 2 and magnetically couples the secondary coil L2 and the primary coil L1. When the secondary power is generated in the secondary coil L2 by the alternating magnetic field from the primary coil L1, the light emitting diode LED1 emits light.

Further, the power supply device 2 and the electric device 10 may be arranged on opposite sides of the door 52, for example, the power supply device 2 may be arranged on the inner surface of the door 52, and the electric device 10 may be arranged on the outer surface of the door 52.

In the third embodiment, the contactless power supply system is applied to the door 52 arranged on the gate post 50. The contactless power supply system may be applied to other doors such as the door of a house, the door of a refrigerator, the door of a bookcase, the door of a storage case, the door of a wardrobe, and the like.

In the third embodiment, the power generating device 55 is arranged on the upper hinge 51 but may be arranged on the lower hinge 51. The power generating device 55 may obviously be arranged on both of the upper and lower hinges 51.

Fourth Embodiment

A contactless power supply system according to a fourth embodiment of the present invention will now be described with reference to FIG. 11. The present embodiment has a feature in the means for acquiring power (fluctuating voltage Vt) of the power supply device 2 and a coupling structure of the power supply device 2 and the electric device 10. Thus, the portion having the feature will now be described.

Figure 11:
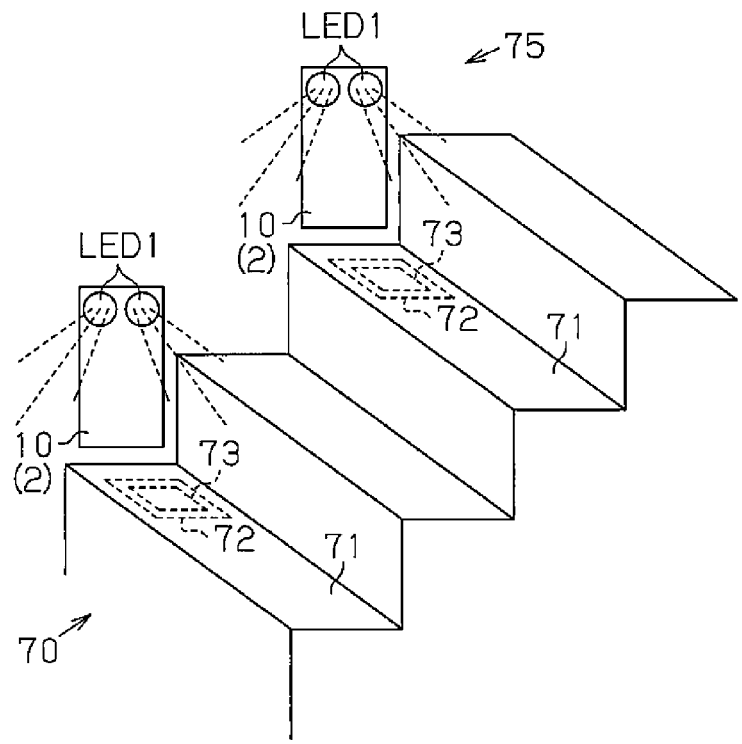
FIG. 11 is a perspective view showing a contactless power supply system according to a fourth embodiment of the present invention.

As shown in FIG. 11, a staircase 70 includes a power generating device 72 on every other step 71. The power generating device 72 arranged on each step 71 includes a piezoelectric element 73. The piezoelectric element 73 is configured to vibrate or move when pushed down to generate a fluctuating voltage Vt when a person goes up and down the staircase 70. In other words, the power generating device 72 is a fluctuating voltage power generating device.

The integrated power supply device 2 and electric device 10 similar to that shown in the third embodiment is arranged on a side wall 75 of the staircase 70 adjacent to each step 71 on which the power generating device 72 is arranged. When the piezoelectric element 73 is pushed down as a person goes up and down the staircase 70, the fluctuating voltage Vt is generated by the piezoelectric element 73, and the high frequency inverter 8 of the power supply device 2 excites the primary coil L1 to generate the alternating magnetic field based on the fluctuating voltage Vt supplied through the wiring (not shown).

The secondary coil L2 of the electric device 10 generates secondary power with the alternating magnetic field from the primary coil L1. The secondary power generated by the secondary coil L2 is supplied to the power receiving circuit 12. The power receiving circuit 12 rectifies the secondary power obtained in the secondary coil L2, converts the power to DC voltage, and emits light from the light emitting diode LED 1 of the electric device 10.

The fourth embodiment has the following advantage in addition to advantages (3) to (5) of the first embodiment.

(1) In the fourth embodiment, the power supply device 2 acquires the power (fluctuating voltage Vt) that excites the primary coil L1 when a person simply goes up and down the staircase 70. The power is supplied to the secondary coil L2 of the electric device 10 arranged on the front surface of the power supply device 2 even if the power supply device 2 and the electric device 10 are not in contact. Thus, the electric device 10 emits light from the light emitting diode LED1 with the secondary power obtained by the contactless power supply in the secondary coil L2 to illuminate the step 71.

Accordingly, using the energy generated by the motion of a person as a power source, the staircase 70 illuminates the foot that a person can safely go up and down the staircase.

Figure 12:
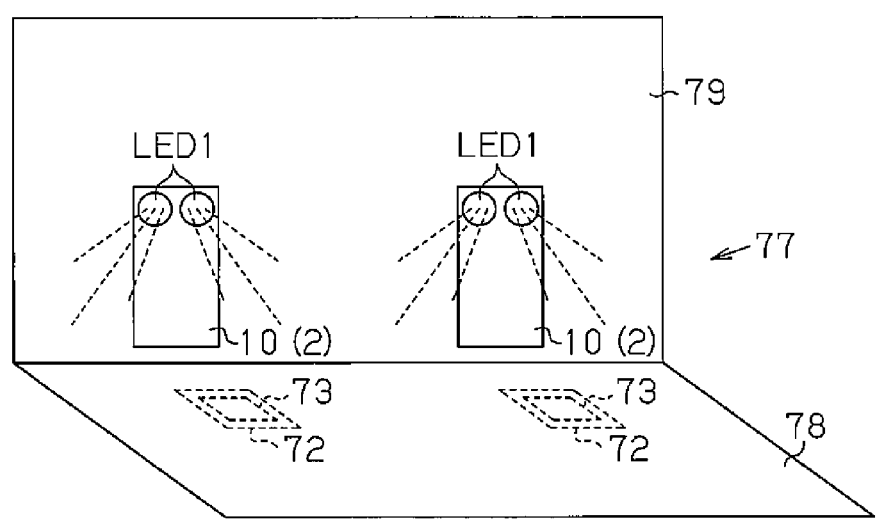
FIG. 12 is a perspective view showing another example of the fourth embodiment of the present invention.

In the fourth embodiment, the power generating device 72 (piezoelectric element 73) is arranged on a step 71 of the staircase 70. However, as shown in FIG. 12, the power generating device 72 may be arranged in a floor 78 of a hallway 77 and the power supply device 2 and the electric device 10 may be arranged on a side wall 79 of the hallway 77.

Accordingly, the foot is illuminated so that a person can safely walk through the hallway 77, and the intrusion of a suspicious person may be recognized.

Fifth Embodiment

A contactless power supply system according to a fifth embodiment of the present invention will now be described with reference to FIGS. 13(*a*) and 13(*b*). The present embodiment has a feature in a means for acquiring the power (fluctuating voltage Vt) of the power supply device 2 and in a structure of the power supply device 2 and the electric device 10. Thus, the portion having the feature will now be described.

Figure 13A:
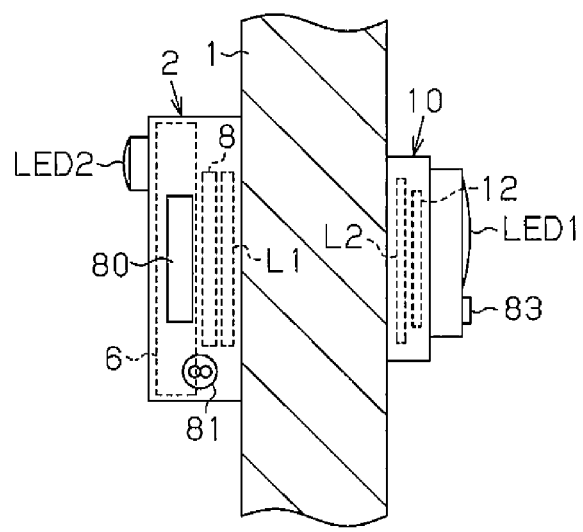
FIG. 13(a) shows a contactless power supply system according to a fifth embodiment of the present invention and is a cross-sectional view of main parts of the power supply device and the electric device.
Figure 13B:
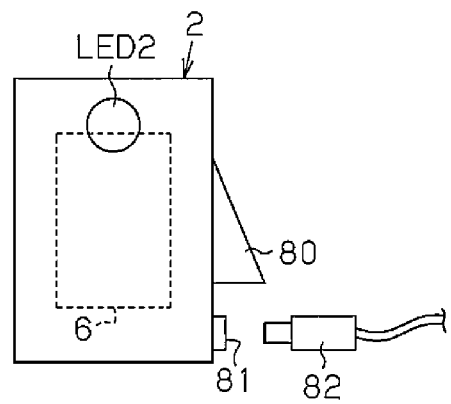
FIG. 13(b) is a front view of the power supply device.

As shown in FIG. 13, the power supply device 2 and the electric device 10 are coupled in a removable manner to the wall 1 on opposite sides of the wall 1 through which the alternating magnetic field passes. In this case, the primary coil L1 of the power supply device 2 and the secondary coil L2 of the electric device 10 are arranged to face each other.

An automatic return type push button 80 is arranged on the side surface of the power supply device 2. The push button 80 is configured to push the piezoelectric element 6 arranged in the power supply device 2. Therefore, the piezoelectric element 6 in the power supply device 2 generates fluctuating voltage Vt when the push button 80 is pushed. That is, the power generator arranged in the power supply device 2 is a push-type power generating device. The fluctuating voltage Vt generated from the piezoelectric element 6 is supplied to the high frequency inverter 8 in the power supply device 2. The high frequency inverter 8 excites the primary coil L1 to generate the alternating magnetic field.

A power plug 81 is arranged at a position below the push button 80 in the side surface of the power supply device 2. The power plug 81, for example, is connected to a power adapter 82 that supplies power from an independent second fluctuating voltage power generating device obtained through a solar battery, wind force generation, human powered generation, and the like to receive the fluctuating voltage Vt from the independent power and supply the fluctuating voltage Vt to the high frequency inverter 8. Obviously, the power plug 81 may be connected to an AC adapter that supplies commercial power. When connecting the AC adapter to input the commercial power, a rectifying circuit is arranged in the power supply device 2, and the voltage from the commercial power needs to be supplied to the high frequency inverter 8 after temporarily being rectified by the rectifying circuit.

A light emitting diode LED2 is arranged on the front surface of the power supply device 2, and the fluctuating voltage Vt supplied to the high frequency inverter 8 is applied to the light emitting diode LED2 to emit light with the fluctuating voltage Vt.

The electric device 10 supplies the secondary power, which is generated in the secondary coil L2 by the alternating magnetic field from the primary coil L1, to the power receiving circuit 12. The power receiving circuit 12 rectifies the secondary power received by the secondary coil L2, converts the power to DC voltage, and emits light from the light emitting diode LED1.

The electric device 10 includes a buzzer 83. The power receiving circuit 12 emits light from the light emitting diode LED1 and makes a sound with the buzzer 83.

The fifth embodiment has the following advantage in addition to advantages (1) to (5) of the first embodiment.

(1) In the fifth embodiment, the power plug 81 is arranged in the power supply device 2 and connected to the power adapter 82 to supply power of an independent fluctuating voltage power generating device obtained through a solar battery, wind force power generation, human powered generation, and the like. Therefore, the power of an independent fluctuating voltage power generating device obtained through a solar battery, wind force power generation, human powered generation, and the like may be used in addition to the push operation of the push button 80. As a result, the light emitting diodes LED1 and LED2 may emit light and the buzzer 83 may make a sound using a wide variety of energy obtained through human powered generation and natural energy.

(2) In the fifth embodiment, the AC adapter for supplying the commercial power is connected to the power plug 81 so that a plurality of power supplies such as commercial power and the like can be simultaneously used or be switched for use.

(3) In the fifth embodiment, the light emitting diode LED2 is arranged on the power supply device 2 and the buzzer 83 is arranged on the electric device 10. Accordingly, two sides of the wall 1 may be illuminated, and the buzzer 83 may made a sound. As a result, the entry of a person may be recognized and a higher crime-prevention effect is achieved with respect to a suspicious person.

Each embodiment described above may be modified as described below.

In the first to fourth embodiments, the light emitting diode LED1 emits light. However, the buzzer 83 of the fifth embodiment may be added or the buzzer 83 may be used in place of the light emitting diode LED1. By making a sound with the buzzer 83, the entry of a person can be recognized and a higher crime-prevention effect may be achieved with respect to a suspicious person.

In the first to third embodiments and the fifth embodiment, the electric device 10 may be an electrical lock, and the load Z of the electric device 10 may be a motor or an electromagnetic solenoid for driving the electrical lock. In this case, the electrical lock can be unlocked with the alternating magnetic field from the primary coil L1 excited by the fluctuating voltage Vt.

In each embodiment described above, the electric device 10 is a lighting device. However, the electric device 10 may be an acoustic device such as a buzzer, a charging device, a display device such as a liquid crystal, a transmitter or a receiver, an electrical toothbrush, a motor drive device such as a fan, and other electronic devices and electric devices.

That is, the electronic device 10 may be an electric device having a function of light emission, sound emission, display, communication, motor drive, electricity accumulation, storage, control, and the like.

Therefore, for example, a power supply device including a push-type power generating device may be added to an ID card, and a reading device for reading the ID card may be used as the electric device. When the ID card is inserted to a card insertion port of the reading device, the push-type power generating device of the power supply device 2 added to the ID card is pushed in the card insertion port thus generating the fluctuating voltage Vt. The power supply device 2 supplies power to the reading device (electric device) and transmits an ID signal based on the generated fluctuating voltage Vt.

Thus, the authentication reading of the ID card can be carried out by simply inserting the ID card into the card insertion port of the reading device.

In each embodiment described above, the first bipolar transistor Q1 is a bipolar transistor but may be changed to a MOS transistor. In this case, 3 V to 4 V of the gate voltage is required to turn ON the MOS transistor so that the electric device 10 can be operated with a contactless power supply if the fluctuating voltage Vt has such a voltage or greater.

In each embodiment described above, the power supply device 2 and the electric device 10 are arranged on the wall 1, the sliding door 40, the door 52, and the like. However, the method for coupling the devices is not particularly limited. For example, the power supply device 2 and the electric device 10 may be coupled to the structural object by an adhesive or a double-sided tape or may be coupled by a screw or be suspended from above by a cord.

Figure 14:
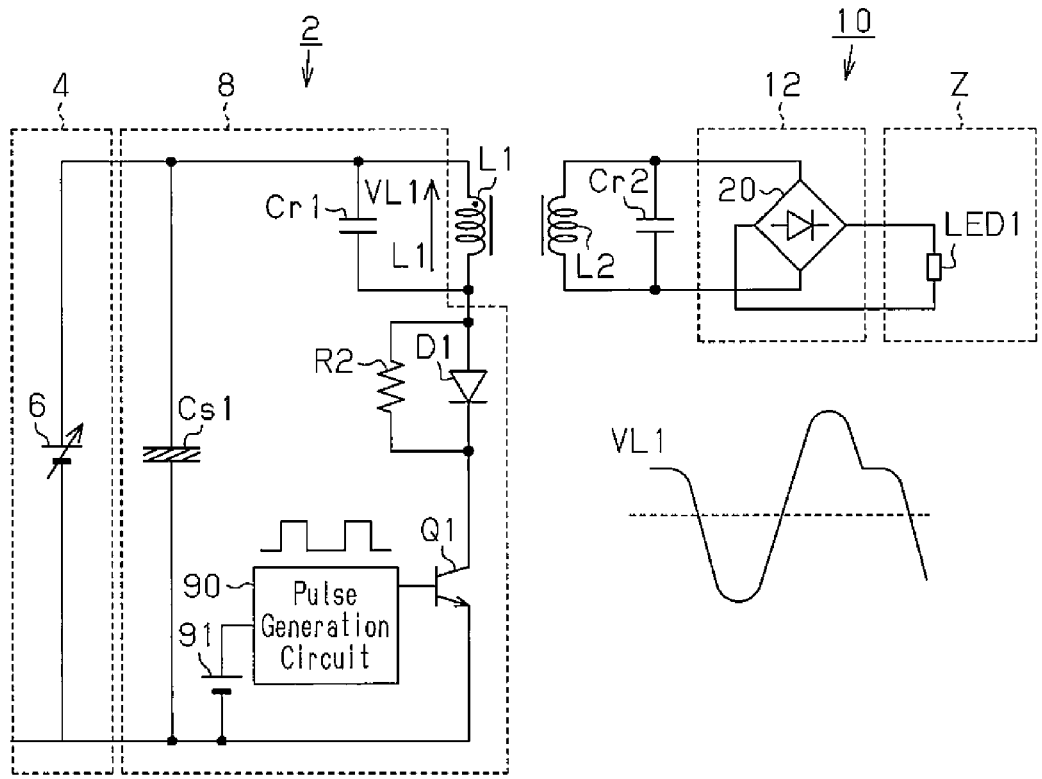
FIG. 14 is an electric circuit diagram showing another example of an electric circuit in the power supply device according to the present invention.

In each embodiment described above, the high frequency inverter 8 is a voltage resonance type inverter of the self-excitation type single-transistor but may be a voltage resonance type inverter of a separate-excitation type single-transistor, as shown in FIG. 14. In this case, as shown in FIG. 14, drive power is applied from a primary battery 91 to a pulse generation circuit 90, and a pulse having an amplitude of about 5 V is supplied from the pulse generation circuit 90 to the base terminal of the first bipolar transistor Q1. Thus, the contactless power supply system is operable if the fluctuating voltage Vt is greater than or equal to 1V.

In each embodiment described above, the high frequency inverter 8 is a voltage resonance type inverter, but may be a switching circuit of a half-bridge type, in which two transistors are used, or a full-bridge type, in which four transistors are used.

In each embodiment described above, the primary side resonance capacitor Cr1 and the secondary side resonance capacitor Cr2 for resonance are respectively connected in parallel to the primary coil L1 and the secondary coil L2 but may be connected in series to the primary coil L1 and the secondary coil L2. If the capacitor is connected in series to the secondary coil L2, an effect of maintaining the output voltage constant without depending on the load Z can be obtained.

Obviously, the primary side resonance capacitor for resonance may be connected in series and in parallel to the primary coil L1 and the secondary coil L2.

In each embodiment described above, the capacitances of the primary side resonance capacitor Cr1 and the secondary side resonance capacitor Cr2 connected to the primary coil L1 and the secondary coil L2 are not limited. The capacitances of the primary side resonance and secondary side resonance capacitors Cr1 and Cr2 are set to values at which the voltage becomes the highest at the drive frequency or values at which the efficiency becomes high when the primary resonance and secondary resonance capacitors Cr1 and Cr2 configure a resonance circuit with the equivalent inductance of the primary coil L1 and the equivalent inductance of the secondary coil L2, respectively. The equivalent inductance also depends on the angle and the position relationship of the primary coil L1 and the secondary coil L2, and thus a change in the equivalent inductance obviously includes not only the distance between the primary coil L1 and the secondary coil L2 but also a change in the angle and the position relationship of the primary coil L1 and the secondary coil L2.

In each embodiment described above, the fluctuating voltage power generating device is a fluctuating voltage power generating device that uses human power in accordance to the intention of a person, and a fluctuating voltage power generating device that uses human power related to living activities. This may be a fluctuating voltage power generating device that generates power with natural energy such as photovoltaic power generation, wind force power generation, water force power generation, and the like.

The fluctuating voltage power generation that uses human power related to living activities includes, for example, acquiring the fluctuating voltage Vt from the rotation of a caster wheel of a bag incorporating the caster. A non-power charging system arranged in the bag may charge the secondary battery with the acquired fluctuating voltage Vt.

The human powered generation related to living activities also includes the acquisition of the fluctuating voltage Vt from the rotation operation of a reel of a fishing rod. The light emitting diode attached to the rod may emit light with the fluctuating voltage Vt acquired by the rotation of the reel.

In each embodiment described above, the power transmission from the power supply device 2 to the electric device 10 is one-way. The electric device 10 may be arranged in the power supply device 2, and a different power supply device 2 may be arranged in the electric device 10 to carry out bi-directional power supply.

The invention claimed is:

1. A method for driving a contactless power supply device that supplies power to an electric device including a secondary coil and a load, wherein the contactless power supply device including a primary coil and a high frequency inverter, the high frequency inverter supplies high frequency current to the primary coil to generate an alternating magnetic field, the alternating magnetic field generates an induced electromotive force at the secondary coil, and the load is driven using the electromotive force, the method comprising:

connecting a resonance capacitor to the primary coil;

connecting a fluctuating voltage power generating device to the high frequency inverter of the contactless power supply device; and providing a fluctuating voltage generated by the fluctuating voltage power generating device to the high frequency inverter and performing an inverter operation with the high frequency inverter using the provided fluctuating voltage, wherein the fluctuating voltage power generating device includes a power generating device arranged on a hinge for coupling a door to a gate post to open and close the door, and the power generating device generates the fluctuating voltage when the door opens or closes to supply the fluctuating voltage to the electric device, the contactless power supply device and the electric device are accommodated in a recess provided in at least one of the gate post and the door, wherein a housing of the contactless power supply device and a housing of the electric device overlap in the recess, the contactless power supply device supplies power to the load of the electric device from the primary coil when the door opens or closes even if the contactless power supply device and the electric device are not in contact.

2. The method for driving a contactless power supply device according to claim 1, wherein the power generating device that generates power with human power is a power generating device that generates power with human power related to a living activity of a person.

3. A contactless power supply system comprising:
- a contactless power supply device including a primary coil and a high frequency inverter, wherein the high frequency inverter supplies high frequency current to the primary coil to generate an alternating magnetic field;
- an electric device including a secondary coil, a power receiving circuit, and a load, wherein the alternating magnetic field generates an induced electromotive force at the secondary coil, the electromotive force is supplied to the load through the power receiving circuit, and the load is driven by the supplied electromotive force; and
- a fluctuating voltage power generating device that is connected to the high frequency inverter of the contactless power supply device and generates a fluctuating voltage used by the high frequency inverter to perform an inverter operation,
- wherein the fluctuating voltage power generating device includes a power generating device arranged a hinge for coupling on a door to a gate post to open and close the door, and
- the power generating device generates the fluctuating voltage when the door opens or closes to supply the fluctuating voltage to an electric device,
- the contactless power supply device and the electric device are accommodated in a recess provided in at least one of the gate post and the door, wherein a housing of the contactless power supply device and a housing of the electric device overlap in the recess,
- the contactless power supply device supplies power to the load of the electric device from the primary coil when the door opens or closes even if the contactless power supply device and the electric device are not in contact.

4. The contactless power supply system according to claim 3, wherein at least one of the primary coil and the secondary coil is connected to a resonance capacitor, and the high frequency inverter is a voltage resonance type inverter.

5. The contactless power supply system according to claim 3, wherein the high frequency inverter is a self-excitation voltage resonance type high frequency inverter.

6. The contactless power supply system according to claim 3, wherein the high frequency inverter includes a switching element that generates a flow of current to the primary coil, and the switching element is a single-transistor voltage resonance type high frequency inverter.

7. The contactless power supply system according to claim 3, wherein the power generating device that generates power with the human power is a power generating device that generates power with human power related to a living activity of a person.

8. The contactless power supply system according to claim 3, wherein
- the contactless power supply system further includes a structural object through which an alternating magnetic field passes; and
- the contactless power supply device and the electric device are arranged on opposite sides of the structural object, and the primary coil of the contactless power supply device is arranged facing the secondary coil of the electric device.

9. The contactless power supply system according to claim 3, wherein the contactless power supply device includes a first housing and the electric device includes a second housing, the contactless power supply device and the electric device are integrated so that the first and second housings overlap, and the primary coil of the contactless power supply device and the secondary coil of the electric device are arranged to face each other through the first and second housings.

10. The contactless power supply system according to claim 3, wherein the contactless power supply device includes
- a power plug, and
- a second fluctuating voltage power generating device that is connected to the power plug and supplies a fluctuating voltage for operating the high frequency inverter to the high frequency inverter through the power plug.

* * * * *